United States Patent [19]

Nilsson

[11] Patent Number: 4,634,529
[45] Date of Patent: Jan. 6, 1987

[54] ROTATABLE DISC FILTER

[76] Inventor: Bjarne Nilsson, Nygatan 18C, 462 00 Vänersborg, Sweden

[21] Appl. No.: 752,177

[22] PCT Filed: Oct. 19, 1984

[86] PCT No.: PCT/SE84/00347
§ 371 Date: Aug. 12, 1985
§ 102(e) Date: Aug. 12, 1985

[87] PCT Pub. No.: WO85/01672
PCT Pub. Date: Apr. 25, 1985

[30] Foreign Application Priority Data

Oct. 21, 1983 [SE] Sweden .............................. 8305817

[51] Int. Cl.⁴ .............................................. B01D 33/26
[52] U.S. Cl. .................................... 210/331; 210/346; 210/486
[58] Field of Search ............... 210/359, 324, 326, 327, 210/330, 331, 400, 401, 404, 346, 486

[56] References Cited

FOREIGN PATENT DOCUMENTS 455277  2/1950  Italy ................................. 210/404

*Primary Examiner*—Frank Sever
*Attorney, Agent, or Firm*—Pollock, Vande Sande & Priddy

[57] ABSTRACT

A disc filter includes a plurality of rotatable, axially spaced, annular discs (9), which are adapted to be partially submerged in a liquid or suspension to be filtered. Each disc comprises a plurality of hollow filter elements (10), the interiors of which communicate with axial suction channels (13) arranged at or near the circumference of the annular discs for withdrawal of filtrate. A collecting funnel (14) is introduced through all discs (10) to receive particles or parts of filter cake falling therefrom. The axial suction channels (13) are provided with backflow barriers (15') adapted to prevent liquid flow from the suction channels (13) radially back into the filter elements when raised above the liquid surface.

4 Claims, 1 Drawing Figure

U.S. Patent      Jan. 6, 1987      4,634,529
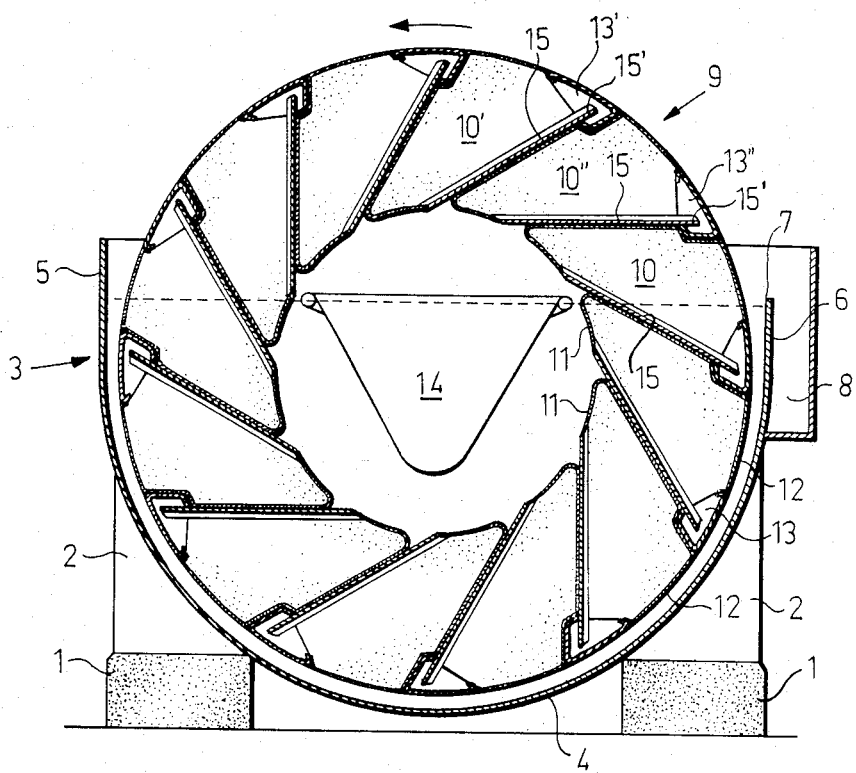

ROTATABLE DISC FILTER

FIELD OF THE INVENTION

The present invention relates to a disc filter of the kind which includes a plurality of rotatable, axially spaced, annular discs, which are adapted to be partly submerged in a liquid or a suspension to be filtered, each disc consisting of a plurality of hollow filter elements, the interiors of which communicate with axial suction channels for withdrawal of filtrate, a collecting funnel being introduced through all the annular discs to receive particles or parts of a filter cake falling therefrom.

BACKGROUND OF THE INVENTION

In a previously known disc filter of this kind (SE-C-7406315-7) the axial suction channels are connected with the radially inner portions of the filter elements. Particularly when filtering pulp suspensions, the suction channels axially extending between the discs constitute an obstacle for falling lumps of the filter cakes deposited on the filter elements, so that such lumps can even end up hanging over the suction channels.

This problem was addressed in Swiss Patent No. 162,137 by providing peripheral suction and a central discharge funnel for filter cake. However, this construction gave rise to the further problem of backflow of the liquid radially inwardly when the filter elements rise above the liquid surface.

SUMMARY OF THE INVENTION

The object of the invention is to solve this problem by the provision of backflow barriers projecting into the suction conduits.

According to another feature of the invention, the suction channels are given a wedge or shovel shape, so that particles deposited at the bottom of the vessel, or thickened suspension, can be lifted from the bottom and remixed into the remaining liquid or suspension.

BRIEF DESCRIPTION OF THE DRAWINGS

In order that the invention may be more clearly understood, it will now be described with reference to the accompanying drawing, which shows a schematical cross-section through a filter according to the invention.

DETAILED DESCRIPTION

On a base structure 1 rests a machine stand 2 which in turn supports a vessel 3 having a semi-cylindrical envelope surface 4, which at its long sides is tangentially extended upwards by vertical portions 5 and 6, the upper edge 7 of the latter forming an overflow inlet, over which liquid or suspension is supplied from an inlet casing 8. In practice, the top of vessel 3 is covered by a casing (non-shown).

In the stand 2 is rotatably journalled an aggregate of a plurality of axially spaced, annular filter discs 9, one of which is shown in the drawing. Each such disc 9 consists of a plurality of substantially triangular, hollow filter elements 10 arranged adjacent each other and having their apex portions 11 directed inwardly and their base portions 12 located at the disc circumference. The base portions 12 are arcuate and mounted in a manner such that the interior of each filter element is in communication with an axially oriented suction conduit 13. All the suction conduits 13 are mutually connected in a suitable way such that they jointly form a "hollow axle" common to all filter discs 9, said axle being driveable for rotating the filter discs in a counter-clockwise direction as seen in the drawing).

In a manner known to those skilled in the art, the suction conduits 13 are connected to an outlet conduit for filtrate such that an under-pressure is established in those suction conduits whose associated filter elements are located partly or entirely under the liquid surface, and is maintained at least until the filter elements have been entirely raised above the liquid surface.

Extending through all the annular filter discs 9 is a collecting funnel 14, which may be provided with a discharge screw (not shown).

Now, if the arrangement is such that the under-pressure ceases as a suction conduit 13' is in the illustrated one o'clock position, particles, or, e.g., a filter cake of pulp fibers sucked onto the filter element 10', can be made to drop into the collecting funnel 14. As is quite obvious, by means of the invention, this can happen without any hindrance during the fall.

The filter elements may have the general shape of an isosceles triangle or a circular sector. However, it is preferred that the filter elements have the shape of a unisosceles triangle, or rather be obliquely circularly sector-shaped, i.e., having their apex portions eccentrically directed. Thus, in the drawing, the apex members 11 are shown as being directed in the rotary direction, i.e., such that the apex portions 11 lead the base or circumference portions 12 in the rotation. This has the great advantage that, as seen in the direction of rotation, the rear or trailing edges 15 of the filter elements incline downwards towards the suction conduits 13 even after the filter elements are raised a considerable distance above the liquid surface. Thus, liquid inside the filter elements is prevented from running out of the elements when they are raised out of the liquid. Instead, the filtrate is conducted along the edges 15, which preferably have a U-shaped cross-section, out to the suction conduits 13.

In order to prevent backflow from the suction conduits, the edges 15 project into the suction conduits so that any filtrate remaining in the suction conduits 13 is prevented by the portions 15' of the edges 15 projecting into the suction conduits from flowing back into the filter elements 10. As shown in the drawing, backflow is effectively prevented approximately from the position occupied by the suction channel 13" of the filter element 10".

It will be noted that the suction channel 13 has a wedge shape with its point in the direction of rotation so as to cause particles deposited on the bottom of the vessel to be re-mixed into the remaining liquid by being lifted and conveyed by the shovel-like suction channels, which during their rotation also cause continous mixing of the liquid or suspension.

I claim:

1. Disc filter comprising a plurality of rotatable, axially spaced, annular filter discs (9), which are adapted to be partly submerged in a liquid or a suspension to be filtered, each disc consisting of a plurality of hollow filter elements (10), axial suction channels (13) arranged adjacent the circumference (12) of said discs (9) for withdrawal of filtrate and communicating with the interiors of said filter elements, a collecting funnel (14) extending through all of said discs to receive filtered out material falling therefrom, wherein said suction channels (13) are provided with backflow barriers (15') for preventing the flow of liquid from said suction channels (13) radially inwards when the filter elements rise above the surface of said liquid.

2. Disc filter according to claim 1, wherein said filter elements (10) have the shape of radially inward tapering sectors, extensions of radially inwardly converging edges of said filter elements intersecting eccentrically with respect to the center of said discs, such that the point of intersection between said edges leads, in the direction of rotation, any point on the outer circumference of the same filter element.

3. Disc filter according to claim 2, wherein the trailing edge (15) of a given filter element is inclined downwards towards the associated suction channel (13) even after said element rises above the liquid surface.

4. Disc filter according to claim 1, wherein said suction channels (13) are wedge shaped.

* * * * *